Patented July 19, 1949

2,476,30(

UNITED STATES PATENT OFFICE

2,476,307

WATER-SOLUBLE ESTERS OF ALKYL SILICONIC ACIDS

David Xavier Klein, Andover, Mass., and Donovan Erb Kvalnes, Penns Grove, N. J., assignors to E. I. du Pont de Nemours & Company, Wilmington, Del., a corporation of Delaware No Drawing. Application October 2, 1946, Serial No. 700,834

3 Claims. (Cl. 260—448.8)

This invention relates to water-soluble long-chain aliphatic ortho-silicate esters.

It is an object of this invention to provide novel organo-silicon compounds which are water-soluble and possess valuable surface-active properties. Another object is to provide novel, water-soluble reagents of the above type which are useful as water-repellency agents for textile fiber. Other and further important objects of this invention will appear as the description proceeds.

According to my invention, the aforegoing objects are accomplished by reacting a silicon ester compound of the formula R—Si(OC₂H₅)₃, wherein R is an alkyl radical of from 12 to 24 carbon atoms, with an ethylene polyglycol of the general formula H—(OC₂H₄)ₙ—OH, wherein $n$ is a numeral not less than 2, whereby the OC₂H₅ radicals in the silicon ester become replaced by polyglycol radicals. When $n=2$ the molecular weight of the polyglycol is 106 and as $n$ increases by units of 1 the molecular weight rises by units of 44.

A common, commercial ethylene polyglycol is one having the unit OC₂H₄ repeated an average of 4 times and therefore corresponding to the formula HOC₂H₄.OC₂H₄.OC₂H₄.OC₂H₄.OH. Because its average molecular weight is in the vicinity of 200, it is commonly designated in the art as polyglycol—200. However, polyglycols of longer chain may also be used for our invention, for instance polyglycol—300, —400 and —600.

The reaction is effected by heating one mole of the long-chain alkyl-silicon triethoxide with 3 moles of the selected polyglycol, while continuously removing, as by distillation, the alcohol split off in the reaction. The resulting compound may be represented by the formula R—Si—(Q—OH)₃, wherein R is an alkyl radical of 12 to 24 carbon atoms, while Q is a polyglycol radical having a chain of from 2 to 12 OC₂H₄ units. It is characterized by solubility in water, which may be enhanced by adjusting the alkalinity of the mixture to a pH of 7.5 to 8.0, and has the useful quality of being an active dispersing agent. For instance, it is effective for producing oil-in-water type emulsions.

Another outstanding and useful quality of the reaction product is its property of rendering textile fiber water-repellent, if the fiber is impregnated with said aqueous solution, squeezed out of excess moisture, and then subjected to a heat treatment at a temperature between 100 and 150° C. Presumably, during this latter "baking step," the silicon ester hydrolyzes, splitting off the polyglycol radicals, and changing the residue into a polymer of an alkyl-siliconic acid wh( monomeric formula is R—SiO.OH, wherein R the long-chain alkyl radical initially started wi Without limiting our invention, the followi examples are given to illustrate our preferr mode of operation. The parts indicated, clea₁ may be varied to any optional magnitude so lo as the same relative proportions are maintain(

*Example 1.—Preparation of the silicon compou:*

29.1 gm. of polyethylene-glycol-200 and 2( gm. of octadecyl-silicon-triethoxide,

were heated in a flask surmounted with Vigreaux column. Originally, the two componer were in separate layers. As the temperatu reached 200° C., a homogeneous solution resulte Heating was continued between 200 and 300° ( while the ethyl alcohol was continuously remove When the head temperature on the colun dropped below 78° C., the heating was inte rupted and the product cooled down. 43 g₁ of a thick oil were obtained, which set to a sem solid gel on long standing. Its average molecul weight corresponded to the formula

This material is soluble in water to give slightly cloudy solution, which has enhanc( stability if an adjustment of alkalinity is ma₁ by means of NaHCO₃ to pH 7.5 to 8.0.

*Example 2.—Use as a dispersing agent*

50 cc. of a 4% solution of octadecyl-silicon-t (glycol-200) ester in water, containing .3 g₁ NaHCO₃, were warmed to 70° C., and 25 gm. ( melted paraffin wax at 70° C. were added to while stirring vigorously with a malted-mi₁ mixer.

A good dispersion was obtained. 10 gm. ( this dispersion were made up to 200 cc. with wate and a piece of olive drab dyed poplin treated ₁ it. After drying it was dipped in dilute oxal acid solution, and then re-dried. A watei repellency of 90+ was obtained.

*Example 3.—Use as a water-repellent per se*

12 gm. of the octadecyl-silicon-tri(glycol-200 ester were dissolved in 240 cc. of water. 90 gn of poplin fabric were wet out thoroughly in th solution and squeezed out. The wet weight c the squeezed fabric was 167 gm., indicating pick up of 77 gm. of solution. This correspond 85 gm. of the ester, which in turn is equivalent .41 gm. of the monomer ($C_{18}H_{37}$—SiO.OH), calculated on the molecular weight ratio 60:314. The fabric was then steamed for 1 , then immersed in a 5% aqueous glycolic solution (to insure complete hydrolysis of ester), and dried at 100° C. Its initial water llency was 100. The final weight of the ma- l was 91.4, indicating an actual pick-up of m. of the polymer. After 3 washes a water- llency of 70 still obtained.

will be understood that the above examples merely illustrative and that the details of edure may be varied widely within the skill ose engaged in this art.

e uses and advantages of our invention will be readily appreciated. The novel products his invention constitute valuable surface e agents of a transitory type which possess, hydrolysis, a high contact angle for the vater-product interface, thus producing a ly water-repellent surface from a soluble rial. While in the soluble stage, they pos- excellent emulsification properties.

e claim as our invention:

A hydrolyzable, water-soluble ester of an l trihydroxy-silane, said ester being char- ized by surface-active properties and being inable by reacting a silicon compound of the ula R—Si—($OC_2H_5$)$_3$, wherein R is an alkyl al of at least 12 carbon atoms, with a poly- lene glycol having the unit $OCH_2.CH_2$ re- ed in a chain from 2 to 12 times, the molal of polyethylene glycol to silicon compound g substantially 3:1.

2. A hydrolyzable, water-soluble ester of oc- tadecyl trihydroxy-silane, said ester being char- acterized by surface-active properties and being obtainable by reacting octadecyl-silicon-triethox- ide with a polyethylene glycol having the unit $OCH_2.CH_2$ repeated in a chain from 2 to 12 times, the molal ratio of polyethylene glycol to octa- decyl-silicon-triethoxide being substantially 3:1.

3. A hydrolyzable, water-soluble ester of octa- decyl trihydroxy-silane, said ester being char- acterized by surface-active properties and being obtainable by heating 1 mole of octadecyl-silicon- triethoxide with substantially 3 moles of tetra- ethylene glycol and continuously removing the alcohol split off in the reaction.

DAVID XAVIER KLEIN.
DONOVAN ERB KVALNES.

REFERENCES CITED

The following references are of record in the file of this patent:

UNITED STATES PATENTS

| Number | Name | Date |
|---|---|---|
| 1,178,731 | Knorr | Apr. 11, 1916 |
| 2,027,931 | Ray | Jan. 14, 1936 |
| 2,048,799 | Lawson | July 28, 1936 |
| 2,349,338 | Clapsadle | May 23, 1944 |
| 2,386,793 | Hanford | Oct. 16, 1945 |

OTHER REFERENCES

Rochow: "Introduction to the Chemistry of the Silicones", 1947, page 122, Wiley & Sons, New York.